United States Patent [19]

Blount

[11] Patent Number: 5,788,915

[45] Date of Patent: Aug. 4, 1998

[54] FLAME RETARDANT COMPOSITIONS UTILIZING PARTIALLY HYDROLYZED AMINO CONDENSATION COMPOUNDS

[76] Inventor: David H. Blount, 6728 Del Cerro Blvd., San Diego, Calif. 92120

[21] Appl. No.: 801,776

[22] Filed: Feb. 14, 1997

Related U.S. Application Data

[62] Division of Ser. No. 723,779, Sep. 30, 1996.

[51] Int. Cl.$^6$ .................... C09K 21/00; C08G 12/12
[52] U.S. Cl. .................... 252/609; 528/259; 252/601
[58] Field of Search .................... 252/609, 601; 528/259

[56] References Cited

U.S. PATENT DOCUMENTS

| | | | |
|---|---|---|---|
| 3,900,665 | 8/1975 | Weil | 428/276 |
| 4,246,146 | 1/1981 | Wood et al. | 260/9 |
| 4,385,131 | 5/1983 | Fracalossi et al. | 521/55 |
| 5,314,928 | 5/1994 | Verhelst | 521/159 |
| 5,344,855 | 9/1994 | Narita et al. | 523/179 |
| 5,510,059 | 4/1996 | Yuki et al. | 252/609 |

*Primary Examiner*—C. H. Kelly

[57] ABSTRACT

Flame retardant compositions of this invention are produced by incorporating a partially index (LOI) hydrolyzed amino condensation composition in a more flammable organic material. The partially hydrolyzed amino condensation compounds are produced by heating urea or heating urea with other nitrogen containing compounds that will condensate with or react with isocyanic acid and/or cyanic acid thereby producing an amino condensation compound which is then partially hydrolysis is done by reacting it with a limited amount of water. The partially hydrolyzed amino condensation compounds may be used alone or may be mixed with or reacted with carbonization auxiliaries, aldehydes and fillers to produce a partially hydrolyzed amino condensation composition which is incorporated in more flammable organic compositions such as polyurethanes, polyester resins, epoxy resins, vinyl resins and other resins. The partially hydrolyzed amino condensation salts of phosphorus, boron or sulfur containing compounds and the partially hydrolyzed amino condensation-aldehyde resins may also be used as the flame retardant compound in this invention. For example, polyurethane foams can be rendered less flammable with the partially hydrolyzed amino condensation compounds or compositions and utilized as cushion and insulating materials.

30 Claims, No Drawings

FLAME RETARDANT COMPOSITIONS UTILIZING PARTIALLY HYDROLYZED AMINO CONDENSATION COMPOUNDS

This application is a divisional of Ser. No. 08/723,779 filed Sep. 30, 1996.

FIELD

The invention concerns urea being condensated with itself or with other organic compounds with a plurality of nitrogen atoms such as amino compounds to produce amino condensation compounds which is then partially hydrolyzed. The invention also concerns their preparation and use. The partially hydrolyzed amino condensation compounds are useful to produce flame retardant plastics and to flame retard natural products, and may be reacted with phosphorus and/or boron containing compounds to produce other flame retardant compounds. The partially hydrolyzed amino condensation compounds may also be reacted with aldehydes to produce partially hydrolyzed amino condensation-aldehyde resins for use as molding compounds, as an adhesive, coating resin or as a flame retardant compound.

BACKGROUND

The heating of urea to produce urea condensation compounds, such as biuret and a mixture of cyanuric acid and cyamelide, is known in the arts, but the partially hydrolysis of these compounds to produce improved flame retardant compounds is novel. The condensation of urea with other organic compounds with a plurality of nitrogen atoms and their partially hydrolysis is novel. The condensation of isocyanuric acid and/or cyanic acid, (which are produced by heating urea),with other nitrogen containing compounds to produce flame retardant compounds is novel. The partially hydrolyzed amino condensation compounds and their phosphorus and/or boron salts may be used as flame retardant compounds in plastics and natural products. Urea and melamine were utilized as a flame retardant compound by Fracalossi, et al., in U.S. Pat. No. 4,385,131. Melamine was utilized as flame retardant compounds in polyurethanes by Yukuta, et al., in U.S. Pat. No. 4,221,875 and by Grinbergs et al., in U.S. Pat. No. 4,745,133. Amino phosphates was utilized by Blount in U.S. Pat. No. 5,010,113.

What is lacking and what is needed are useful inexpensive partially hydrolyzed nitrogen containing organic compounds with a plurality of nitrogen moieties. The partially hydrolyzed amino condensation compounds and/or their salts of this invention and the partially hydrolyzed amino-aldehyde resins are novel flame retardant compounds. The partially hydrolyzed amino condensation compounds such as partially hydrolyzed urea condensation compounds, urea-melamine condensation compound, urea-dicyandiamide compounds, urea-guanidine condensation compounds, etc., are novel flame retardant compounds. What is additionally lacking are compositions having such partially hydrolyzed amino condensation compounds and/or their salts employed therein.

SUMMARY

In one aspect, the invention comprises partially hydrolyzed amino condensation compounds and their salts which I named ammonium polyaminocarbamate. Another aspect of the invention is a process to prepare partially hydrolyzed amino condensation compound (ammonium polyaminocarbamate) and/or their salts comprising serially contacting, heating and reacting:

(A) urea;
(B) nitrogen containing compound that will condensate or react with urea; then
(C) water;

under conditions sufficient to prepare the partially hydrolyzed amino condensation compounds (ammonium polyaminocarbamate). The urea is first heated to produce isocyanuric acid and/or cyanic acid then reacted with urea to form biuret or a mixture of cyanuric acid and cymelide or reacted with Component B or with more urea plus Component B to produce a mixture of biuret, cyanuric acid and cymelide and condensed urea-nitrogen containing compound then they are partially hydrolyzed with a limit amount of water to produce ammonium polyaminocarbamate.

In another aspect, the invention comprises partially hydrolyzed amino condensation salt of phosphorus and/or boron containing compound and a process to prepare a partially hydrolyzed amino condensation salt of a phosphorus and/or boron containing compound employing phosphorus and/or boron containing compound that will react with the partially hydrolyzed amino condensation compound under conditions sufficient to prepare the partially hydrolyzed amino condensation salt of a phosphorus and/or boron containing compound, and a process to prepare a partially hydrolyzed amino condensation salts of a phosphorus and/or a boron containing compound comprising serially contacting, heating and reacting:

(A) urea;
(B) nitrogen containing compound that will condensate or react with urea; then
(C) water; then
(D) phosphorus and/or boron containing compound that will react with a partially hydrolyzed amino condensation compound.

component A and B are first heated and reacted, then a limited amount of water is added and heated to produce a partially hydrolyzed amino condensation compound, then component D is added and reacted.

An addition aspect of this invention is the production of partially hydrolyzed amino condensation-aldehyde resins and a process to prepare partially hydrolyzed amino condensation-aldehyde resins under conditions sufficient to prepare the partially hydrolyzed amino condensation-aldehyde resin comprising serially contacting, heating and reacting:

(A) urea;
(B) nitrogen containing compound that will condensate or react with urea; then
(C) water; then
(E) aldehyde; and a
(G) a basic or acidic catalyst;

components A and B are first reacted to produce an amino condensation compound which is then partially hydrolyzed with a limit amount of water to produce a partially hydrolyzed amino condensation compound (ammonium polyaminocarbamate) which is then reacted with component E in the presence of component G.

An additional aspect of the invention is use of the partially hydrolyzed amino condensation compounds, partially hydrolyzed amino condensation salts of phosphorus and/or boron compounds and partially hydrolyzed amino condensation-aldehyde resins as flame retardant compounds. The flame retardant use comprises contacting an otherwise more flammable organic material with the partially hydrolyzed amino condensation compounds and/or partially hydrolyzed amino condensation salts of phosphorus and/or boron containing compounds and/or partially hydrolyzed amino condensation-aldehyde resins thereof under conditions sufficient to lower the combustibility of the otherwise more flammable organic material, for example plastics, natural products or polyurethanes. Thus, a further aspect of the invention is a flame-retardant composition comprising an otherwise more flammable organic material incorporated therewith a flame retardant amount of a partially hydrolyzed amino condensation compound (ammonium polyaminocarbamate) and/or a partially hydrolyzed amino condensation salt of a phosphorus and/or boron containing compound, and/or partially hydrolyzed amino condensation-aldehyde resin, carbonization auxiliaries and fillers.

The flame-retardant compounds of this invention are produced by heating urea (Component A) with urea or another nitrogen containing compound (Component B) to above the melting point of urea to about 160 degree C. at ambient pressure for 0.1–3 hrs. Upon heating above the melting point urea forms a very reactive compound isocyanic acid which will react with itself or other urea or other organic or inorganic nitrogen containing compounds especially amino compounds. In order to increase the flame retardant properties and carbonization properties of the partially hydrolyzed amino condensation compound a carbonization auxiliary (Component E), such as, phosphorus acidic compounds, or organic phosphorus compounds that will react with an amino compound, boric acid, etc., is added to the melted partially hydrolyzed amino condensation compound (ammonium polyaminocarbamate) mixed and/or reacted. Other carbonization auxiliaries may be mixed with the partially hydrolyzed amino condensation compounds such as urea phosphate, melamine phosphate, magnesium phosphate, etc., to produce the flame retardant partially hydrolyzed amino condensation composition. The partially hydrolyzed amino condensation compounds (ammonium polyaminocarbamate) may be further reacted with an aldehyde (Component D) in the presence of a neutral or basic or acidic catalyst by mixing and heating the partially hydrolyzed amino condensation compound with the aldehyde, usually in an aqueous medium, to just below the boiling point of the components at ambient or an elevated pressure thereby producing a partially hydrolyzed amino condensation-aldehyde resin (ammonium polyaminocarbamate-aldehyde). Fillers, (Component F) and carbonization auxiliaries may be added to the partially hydrolyzed amino condensation compounds or the partially hydrolyzed amino condensation-aldehyde resin. The partially hydrolyzed amino condensation compounds and partially hydrolyzed amino condensation-aldehyde resins with or without carbonization auxiliaries and fillers may be reacted with or added to or applied on a more flammable organic material (Component H).

It is preferable to produce the partially hydrolyzed amino condensated compounds (ammonium polyammocarbamate) by utilizing urea or heated condensated compounds of urea such as biuret or a mixture of cyanuric acid and cyamelide which is then heated with a limited amount of water for hydrolysis of the $NH_2$ radical or radicals to form $—COONH_4$ radicals on the partially hydrolyzed amino condensation compounds which has the general formula of:

wherein n is a number 1–8.

Partially hydrolyzed amino condensation compounds (ammonium polyaminocarbamate) may be produced by other means such as reacting ammonia and carbon dioxide under pressure and elevated temperature to produce ammonium carbonate, ammonium carbamate and urea in water. Most of the water is then removed under satisfactory physical conditions and by any satisfactory means such as crystalization, distillation or air dried. Usually at ambient temperature or at a temperature below the temperature that ammonium carbamate breaks down into ammonia and carbon dioxide. The water is removed until there is about 10 to 40 parts by weight of water to 100 parts by weight of urea present in the mixture. The mixture is then heated under satisfactory physical conditions, usually at ambient pressure and 100° to 160° C. The mixture is first heated to about 100° C. then slowly elevated to convert the urea to cyanic acid and ammonia. The cyanic acid then reacts with the $NH_2$ radical on the ammonium carbamate and with itself to produce a partially hydrolyzed amino compound (ammonium polyaminocarbamate). The partially hydrolyzed amino compound may be further hydrolyzed by reacting it's $NH_2$ radical with water to produce $—COONH_4$ radicals thereby producing partially hydrolyzed amino compounds with the general formula of:

wherein n is a number 1–8. Part of the ammonium carbamate lose water to urea and part breaks down to ammonia and carbon dioxide which is recycled. A partially hydrolyzed amino condensation composition is produced containing ammonium carbonate and polyaminocarbamate.

Component A

Urea is utilized as component A and may be in the form of a powder, crystals or a solid. Any suitable urea may be utilized that will react with a nitrogen containing compound. Urea is usually produced by reacting ammonia and carbon dioxide which is heated under pressure in a reactor containing water. The ammonia and carbon dioxide is reacted to form ammonium carbamate. Part of the ammonium carbamate reacts with water to form ammonium carbonate and part loses water to form urea. The ammonium carbonate and ammonium carbamate may be removed from the aqueous solution by low temperature distillation. They dissociated to ammonia and carbon dioxide and recycled. The urea is separated from the aqueous solution by crystallization or by a form of spray-drying.

Component B

Any suitable nitrogen containing compound that will react with isocyanic acid and/or cyanic acid may be utilized in this invention. The nitrogen containing compound may be an organic or an inorganic compound. Suitable organic nitrogen containing compounds may be an aliphatic, aromatic, cyclic, aliphatic-aromatic or aliphatic-cyclic compound such as, but not limited to, urea, urea derivatives for example, O-alkylureas, amino compounds, for example, melamine, melamine cyanurate, dicyandiamide, biuret, guanidine, cyanoguanidine, ammeline and aminoguanidine, guanidine carbonate, ammonium carbonate, alkyl carbamates, alkyl isocyanates, polyisocyanates, sulfamic acid, ammonium sulfamate, amines, polyamines, thioureas, alkylanolamine, polyamides, amino hydrogen phosphates, amidines, amides, aldimines, ketimines, amino carbonates, aminoborates, amino sulfates, thiourea derivatives, alkylanolamines, nitrites, etc., and mixtures thereof. Suitable inorganic nitrogen containing compounds such as, but not limited to, ammonium phosphate, diammonium phosphate, ammonium polyphosphate, ammonia borate, ammonium hydrogen sulfate, quaternary ammonium salts, ammonium bicarbonate, ammonium carbonate, ammonium carbamate etc. and mixtures thereof. The amino compounds are the preferred nitrogen containing compound. The nitrogen containing compound may be utilized in the amount of 10 to 300 percent by weight based on the weight of urea.

When urea reacts with an amino compound to form an amino condensation compound, it is partially hydrolyzed with water and then a partially hydrolyzed amino condensation compound is formed (ammonium polyaminocarbamate) with the general formula of:

herein n is a number 1–4, y is a number 1–8 and z is a number 0–4.

Component C

Water is utilized in the amount of 10 to 40 parts by weight to 100 parts by weight of urea. Water may be added to the urea before it is heated and condensated or after it is condensated.

Component D

Any suitable aldehyde may be reacted with the amino condensation compounds. Suitable aldehydes include, but not limited to, formaldehyde, paraformaldehyde, acetoaldehyde, butyraldehyde, chloral, and other alkyl aldehydes, furfural, benzyl aldehyde and other aromatic aldehydes. Aqueous formaldehyde is the preferred aldehyde. Aldehyde is used in the amount of 0 to 100 parts by weight.

Component E

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 300 percent by weight of the partially hydrolysed amino condensation compound.

The nitrogen containing salts of phosphorus acids are the preferred carbonization compounds, such as amino phosphate, amino salts of organic phosphorus compounds and amino condensation salt of inorganic and organic phosphorus compounds. The amino condensation salt of phosphorus compounds are produced by contacting the partially hydrolyzed amino condensation compounds (ammonium polyaminocarbamate) with a phosphorus containing compound that will react with an amino compound, under conditions sufficient to prepare a partially hydrolyzed amino condensation salt of a phosphorus containing compound. Suitable inorganic phosphorus compounds include, but not limited to, phosphoric acid, pyrophosphoric acid, triphosphoric acid, metaphosphoric acid, phosphorous acid, hydrophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkali metal dihydrogen phosphate and halogenated phosphate-phosphite and their halides and acids. Organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters and mixtures thereof. Partially hydrolyzed amino condensation borates may be produced by contacting boric acid and partially hydrolyzed amino condensation compound under conditions sufficient to prepare the partially hydrolyzed amino condensation borates which may also be utilized as a flame-retardant compound. Partially hydrolyzed amino condensation salt of boron-phosphates may be produced by contacting boron-phosphates and partially hydrolyzed amino condensation compounds under conditions sufficient to prepare partially hydrolyzed amino condensation salt of boron-phosphate compounds which may also be utilized as a flame-retardant compound. The salt forming phosphorus containing compounds will react with the partially hydrolyzed amino condensation compounds to form a partially hydrolyzed amino condensation salt of a phosphorus containing compound.

Component F

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, metals, oxides, carbonates, sulphates, phosphates, borates, glass beads or hollow glass beads. Hydrated aluminum oxide is preferred. They may be organic substances, such as, amino compounds, such as urea, melamine, dicyandiamide, and other cyanuric derivatives or their formaldehyde resins, aminophosphates, amino salts of organic phosphates, phenolaldehyde resin powder, powdered coke, graphite, graphite compounds and mixtures thereof. The organic halide flame retardant compounds may also be added as fillers. The filler may be used in the amount of 0 to 300 percentage based on the weight of the partially hydrolyzed amino condensation compound.

Component G

Any suitable basic or acidic catalyst may be used in the reaction of amino condensation compounds with aldehydes. Suitable basic compounds include but not limited to, compounds containing alkali metal, alkaline earth metal and ammonia radicals and mixtures thereof. Suitable acidic compounds include, but not limited to, halogen acids, acidic phosphorus containing compounds, acidic compounds containing sulfur, sulphonic acid, halides, carboxylic acids, polycarboxylic acids, nitric acids and mixtures thereof. In some reactions basic or acidic catalytic are not necessary. A catalytic amount is utilized.

Component H

Any suitable organic material which is more flammable than the partially hydrolyzed amino condensation compounds, its salts and partially hydrolyzed amino condensation-aldehyde resin may be used in this invention. Any suitable plastic resin composition or mixtures thereof and any suitable natural organic material maybe used in this invention and mixtures thereof. These materials may be in the form of a solid, cellular suspension, emulsion or solution. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyidienes, poly(vinyl acetate), aliphatic allyl compounds, polyacrylonitrile, aliphatic dienes, polybutadiene, butadiene-acrylonitrile, butadiene-styrene copolymers, aromatic vinyl compounds, heterocyclic vinyl compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to wood, cellulose, lignin-cellulose, paper, cotton, wool, linen, dammars, copols, other natural resins, rosins, lignin, natural rubber, natural proteins, e.g., soya bean protein, silk, glues, gelatin, etc.; modified cellulose and mixtures thereof. Natural organic material and plastics may be mixed together. The partiallly hydrolyzed amino condensation compounds, its salts and partially hydrolyzed amino condensation-aldehyde resin or partially hydrolysed amino condensation composition maybe utilized in the amount of 3–200 percent, percentage based on the weight of the more flammable organic material.

ILLUSTRATIVE EMBODIMENTS

In general, the partially hydrolyzed amino condensation compounds(ammonium polyaminocarbamate) are compounds which are produced by heating urea with urea or other nitrogen containing compounds that will condensate or react with urea to produce amino condensation compounds. The heated urea first form isocyanic acid and/or cyanic acid which polymerizes with itself to form a mixture of cyanuric acid and cyamelide and/or biuret. When urea is heated with another nitrogen containing compound, such as, melamine a different compound is formed. This compound is converted to a partially hydrolyzed compound by reacting water with the $NH_2$ radical of this compound to form $NH_4OOC$— radicals.

Any amount of the partially hydrolyzed amino condensation compound or the partially hydrolyzed amino condensation composition which includes the partially hydrolyzed amino condensation compound (ammonium polyaminocarbamate) and/or its salts, and may include carbonization auxiliaries and fillers suitable for this invention, may be utilized. Preferably, flame retardant amounts of the amino condensation compounds and/or its salts and/or the amino condensation-aldehyde resin or the amino condensation composition are from 3 percent by weight to about 200 percent by weight of the otherwise more flammable organic materials such as polyester resins, polyepoxy resins, polyurethane components, acrylic and acrylate resins, polyacrylonitrile, polystyrene, etc.

One method to measure this flame retardant capability is an oxygen index test. By selecting the various combinations of the partially hydrolyzed amino condensation composition to incorporate into a more flammable organic material the average limiting oxygen index (LOI) can be raised 10 to 30 percent or more when compared to otherwise comparable samples without the flame retardant partially hydrolyzed amino condensation composition. For example the LOI of three flexible polyurethane foams with the partially hydrolyzed amino condensation composition were raised more than 30 percent to a LOI of 31.7, 30.3 and 30.7.

When the partially hydrolyzed amino condensation composition was incorporated into rigid polyurethane foam and tested with a propane torch with a 2" flame held against the foam for one minute, the flame did not spread, the foam melted and/or a char was formed. The flame went out when the torch was removed.

Various partially hydrolyzed amino condensation compositions were incorporated into liquid resins then cured into a solid in the form of a ⅛"×2"×6" sample, for example, flexible polyepoxy resins, rigid polyepoxy resins, polyester laminating and flexible resin, polystyrene resin, polymethyl methyl acrylate resin, polyvinyl acetate resin, polyurethane, polyisoprene, polyethylene, acrylonitrile, etc, then tested with a propane torch having a 2" flame, and held against the sample for one minute, the flame did not spread, and went out when the flame was removed. Various partially hydrolyzed amino condensations compounds or compositions was add to aqueous emulsions and organic solutions of the above plastics then dried to form a test sample, then tested as above. The meltable plastics above was melted and the various partially hydrolyzed amino condensation compounds or compositions were incorporated into the melted plastics then molded into a test sample and tested as above. The said above material were tested without the partially hydrolyzed amino condensation composition and all burned.

The flexible flame retardant polyurethane foams were tested utilizing the Calif. TB 133 test which utilizes a 100 gms of wood in the form of a crib being burned on top of the flexible foam. If more than 60 gms of the foam burns away it fails this test.

Various natural products such as wood shingles, paper, cotton cloth, and cardboard were coated with various partially hydrolyzed amino condensation compositions in an aqueous emulsion containing 20% by weight of the powdered partially hydrolyzed amino condensation composition with or without adhesives, then after the product had dried, they were tested by applying a 2" flame from a propane torch against the products, and the flame did not spread whereas the uncoated products caught on fire and burned.

DESCRIPTION OF PREFERRED EXAMPLES

The present invention will now be explained herein-after by way of a few examples and comparative examples, these examples setting, however, no limits to this invention. Parts and percentages are by weight, unless otherwise indicated.

Example 1

Two-three heated moles of ammonia to one mol of heated carbon dioxide, heated at 160° to 210° C. is forced through a reactor which has an aqueous solution or oil-water slurry of ammonia and carbon dioxide which is being circulated at 160° to 210° C. and under 2–6000 psi to form ammonium carbamate which when heated lose 1 mol of water thereby producing urea. The urea is in the aqueous solution after being removed from the reactor is distilled to remove ammonium carbonate and undecomposed ammonium carbamate, which dissociate to ammonia and carbon dioxide. The urea is separated from the concentrated aqueous still-residue at a low temperature by crystallization or by a form of spray-drying known as prilling. The temperature is kept low to prevent the formation of biuret. 30 parts by weight of water are added to 100 parts by weight of urea which is then heated to above the melting point of urea and up to about 160° degree C°. for 0.1 to 1 hour. Ammonia evolves from the melted urea thereby producing a partially hydrolyzed amino condensation compound (a mixture of a small amount of ammonium carbonate and partially hydrolyzed biuret). The partially hydrolyzed amino condensation compound (ammonium polyaminocarbamate) is ground into a fine powder.

Example 2

Example 1 is modified wherein the aqueous solution containing ammonium carbonate, ammonium carbamate and urea is not distilled to remove the ammonium carbonate and ammonium carbamate but most of the water is removed from the mixture by distilling at a low temperature or by spray drying until 20 to 40 parts by weight of water per 100 parts by weight of urea remains. The mixture is then slowly heated at ambient pressure to elevate the temperature in order to melt the mixture then the temperature is slowly elevated to 120–160 degree C. and heated for 30 minutes. Ammonia evolves from the mixture. Part of the ammonium carbamate loses water and forms urea. The heated urea forms isocyanic which polymerizes with itself and reacts with the $NH_2$ radicals on the ammonium carbamate and some of the $NH_2$ radical are hydrolyzed to form $NH_4OOC-$ radicals thereby producing a mixture of ammonium polyaminocarbamate and ammonium carbonate. The mixture is pulverized into a powder.

Example 3

About 100 parts by weight of urea beads are mixed with 30 parts by weight of water then heated to 120–160 degrees C., and heated for 30 minutes thereby producing partially hydrolyzed amino compound (ammonium polyaminocarbamate) which is cooled by spraying into a flow of air or cooled then pulverized into a powder.

Example 4

About 100 parts by weight of granular biuret produced by heating urea, is mixed with 30 parts by weight of water then heated to above the melting point of biuret to 120–160 degrees C. for 30 minutes, ammonia evolves from the mixture, thereby producing a partially hydrolyzed biuret compound (ammonium polyaminocarbamate) which is pulverized into a powder.

Example 5

About 100 parts by weight of a mixture of granular cyanuric acid and cyamelide, produced by heating urea, are mixed with 20 parts by weight of water then heated to 120–160 degree C. for 30 minutes, ammonia evolved from the mixture, thereby producing a partially hydrolyzed amino condensation compound (ammonium polyaminocarbamate) which is pulverized into a powder.

Example 6

100 parts by weight of urea and 50 parts by weight of melamine are mixed then heated to above the melting point of urea and up to 160 degree C. for 0.5 to 2 hours. Ammonia evolves from the mixture thereby producing an amino condensation compound (urea-melamine condensation compound). 25 parts by weight of water are added to the amino condensation compound and heated to 110° to 130° C. for 30 minutes thereby producing a partially hydrolyzed urea-melamine condensation compound. The cooled partially hydrolyzed amino condensation compound is ground into a fine powder.

Example 7

Example 6 is modified wherein 75 parts by weight of melamine is used instead of 50 parts by weight.

Example 8

Example 6 and 7 are modified wherein another nitrogen containing compound is used in place of melamine and selected from the list below:

| | |
|---|---|
| a) dicyandiamide | k) biuret |
| b) guanidine | l) ammonium bicarbonate |
| c) aminoguanidine | m) methylolurea |
| d) thiourea | n) methylthiocyanate |
| e) ethylamine | o) melamine phosphate |
| f) diethylamine | p) urea phosphate |
| g) ammonium carbonate | q) melamine borate |
| h) urea carbonate | r) guanidine carbonate |
| i) diethylanolamine | s) aniline |
| j) ammonium sulfamate | t) melamine cyanurate |
| k) ethyl carbamate | u) guanidine phosphate |
| l) ethyl isocyanate | v) acrylonitrile |
| | w) urea |

Example 9

About 100 parts by weight of the partially hydrolyzed urea-melamine condensation compound of example 6 is mixed with 25 parts by weight of phosphoric acid (75%) then heated to above the melting point of the partially hydrolyzed urea-melamine condensation compound for about 30 minutes thereby producing a partially hydrolyzed urea-melamine condensation salt of phosphoric acid.

Example 10

Example 9 is modified by first reacting 5 parts by weight of boric acid with the 25 parts by weight of phosphoric acid thereby producing a boron-phosphate condensation compound and utilizing it in place of the phosphoric acid in example 9.

Example 11

Example 9 is modified wherein another phosphorus containing compound is utilized in place of phosphoric acid and selected from the list below:

| | |
|---|---|
| a) pyrophosphoric acid | n) tris(2-chloropropyl) phosphate |
| b) phosphinic acid | o) triphenyl phosphite |
| c) phosphorus trichloride | p) tris 2-chloroethyl phosphite |
| d) phosphorus oxytrichloride | q) triethyl phosphite |
| e) phosphorus oxide | r) urea dihydrogen phosphate |
| f) ammonium dihydrogen phosphate | s) diethyl phosphite |
| g) mono-aluminum phosphate | t) trimethyl phosphite |
| h) dimethyl methyl phosphonate (DMMP) | u) dibutyl pyrophosphoric acid |
| i) dimethyl hydrogen phosphite | v) melamine hydrogen boron-phosphate |
| j) phenyl acid phosphate | x) hypophosphorous acid |

-continued

| | |
|---|---|
| k) methylchlorophosphine | y) methyl amine salt of phosphoric acid |
| l) phosphorus | z) O,O-dimethyl hydrogen dithiophosphate |
| m) phosphorus thiochloride | |

Example 12

Example 3 is modified wherein a phosphorus containing compound selected from the list in example 11 is added to the urea before it is heated thereby producing a mixture of urea condensation salt of a phosphorus containing compound and partially hydrolyzed biuret salt of a phosphorus containing compound. The mixture is ground into a fine powder.

Example 13

30 parts by weight of the melted partially hydrolyzed urea-melamine condensation compound of example 6 are added to 100 parts by weight of a polypropylene triol with a 56 hydroxyl number and a mol wt. of 3000 thereby producing a stable emulsion for use in the production of flame retardant polyurethane products.

Example 14

Example 9 is modified wherein 20 parts by weight of powdered dimelamine phosphate is added to and mixed in with the melted partially hydrolyzed urea-melamine condensation compound thereby producing a flame retardant amino condensation composition which is cooled and ground into a powder.

Example 15

Example 9 is modified wherein 25 parts by weight of melamine powder are added to and mixed in with the melted partially hydrolyzed amino condensation compound thereby producing a flame retardant partially hydrolyzed amino condensation composition.

Example 16

100 parts by weight of urea, 50 parts by weight of melamine powder and 20 parts by weight of boric oxide are mixed then heated above the melting point of urea and up to 160 degree C. for 45 minutes while agitating. Ammonia evolves from the solution. About 30 parts by weight of water is added to the urea-melamine-boron compound and heated at 110°–130° C. for 20–30 minutes thereby producing a partially hydrolyzed urea-melamine condensation compound containing boric oxide. The compound is cooled, then ground into a fine powder.

Example 17

100 parts by weight of urea, 30 parts by weight of dicyandiamide and 20 parts by weight of boric acid are mixed then heated above the melting point of urea and up to 160 degree C. for 0.5 to 1 hour. Ammonia evolves from the mixture thereby producing a mixture of urea-dicyandiamide condensation containing urea borate. 30 parts of water is added then heated at 110°–130° C. for 20–30 minutes. The mixture of partially hydrolyzed urea-dicyandiamide condensation containing urea salt of boric acid is cooled then grown into a fine powder thereby producing a flame retardant partially hydrolyzed amino condensation composition.

Example 18

100 parts by weight of urea, 30 parts by weight of melamine phosphate are mixed then heated above the melting point of urea and up to 160 degree C. for 40 minutes thereby producing a flame retardant amino condensation salt of phosphate composition. 25 parts by weight of water is added and heated for 20–30 minutes thereby producing a partially hydrolyzed urea-melamine phosphate condensation. After cooling it is ground into a fine powder.

Example 19

Example 16 is modified wherein 10 parts by weight of a phosphorus salt forming compound selected from the list below is added to and reacted with the partially hydrolyzed amino condensation composition containing boric oxide:

| | |
|---|---|
| a) phosphoric acid | h) phosphinic acid |
| b) pyrophosphoric acid | i) phosphorus oxytrichloride |
| c) dimethyl methyl phosphonate (DMMP) | j) ammonium dihydrogen phosphate |
| d) dimethyl hydrogen phosphite | k) dimethyl phosphoric acid |
| e) trimethyl phosphite | l) diethyl ethyl phosphonate |
| f) phenyl acid phosphate | m) magnesium hydrogen phosphate |
| g) phosphorus trichloride | n) mono aluminum phosphate |

Example 20

Example 6 is modified wherein 20 parts by weight of a halogenated flame retardant compound selected from the list below is mixed with the powdered partially hydrolyzed urea-melamine condensation compound thereby producing a flame retardant partially hydrolyzed amino condensation composition:
a) brominated epoxy olgmer
b) decabromodiphenyl oxide
c) pentabromodiphenyl oxide
d) 2,3-dibromopropanol
e) octabromodiphenyl oxide
f) tris (dichloropropyl) phosphite
g) tris(dichloropropyl) phosphite

Example 21

Example 4 is modified wherein 20 parts by weight of a powdered filler selected from the list below is mixed with the powdered partially hydrolyzed urea condensation compound thereby producing a flame retardant partially hydrolyzed amino condensation composition:

| | |
|---|---|
| a) hydrated aluminum oxide powder | o) urea phosphate |
| b) hydrated sodium silicate powder | p) silica powder |
| c) melamine | q) phenol-formaldehyde resin powder |
| d) dicyandiamide | r) aluminum phosphate |
| e) urea | s) thiourea |
| f) melamine phosphate | t) hollow beads |
| g) melamine borate | u) expandable graphite |
| h) ammonium phosphate | v) melamine salt of DMMP |
| i) ammonium pyrophosphate | r) ammonium sulfate |
| j) ammonium carbonate | s) magnesium chloride |
| k) ammonium borate | t) antimony trioxide |
| l) ammonium sulfamate | u) boron-phosphate powder |
| m) guanidine | w) melamine boron-phosphate powder |
| n) guanidine carbonate | x) ammonium boron-phosphate powder |

Example 22

30 parts by weight of the partially hydrolyzed urea-melamine condensation compound of example 6 are mixed and reacted with 10 parts by weight of dimethyl methyl phosphonate (DMMP) thereby producing a partially hydrolyzed amino condensation salt of DMMP composition, then it was added and mixed with 60 parts by weight of a flexible polyepoxy resins with its polyamine curing agent. The resin is cured then was tested with a 2" propane flame held against the sample for 1 minute. The flame did not spread and the flame went out when the torch was removed. There was about a 2% weight loss.

Example 23

30 parts by weight of the partially hydrolyzed amino condensation composition of example 14 are mixed with 50 parts by weight of a flexible polyester resin containing its catalyst. The resin is cured then flame tested using a propane torch with a 2" flame held against the sample for 1 minute. The flame did not spread and went out when the torch was removed. There was about a 2% weight loss.

Example 24

30 parts by weight of the partially hydrolyzed amino condensation composition of 21c is incorporated into 70 parts by weight of a flexible polyurethane foam produced from MDI and a triol which weighs about 1.75 lbs./cu.ft. The foam was flame tested by using Calif. TB 133 Test wherein 100 gms of wood is burned on top of the foam. After burning the wood on the foam there was a 50.5 gms weight loss. A weight loss of less than 60 gms is necessary to pass the test. This foam was flame tested using a ½"×2"×6" sample hung vertically, then a 2" propane torch flame was placed at the botton of the sample for 1 minute. The flame did not spread and the foam melted without burning.

Example 25

30 parts by weight of the partially hydrolyzed amino condensation composition of example 14 are incorporated in 50 parts by weight of a rigid polyurethane foam of about 2 lbs./cu.ft., produced using polymeric MDI and aromatic polyester polyol. The rigid polyurethane foam was flame tested using a propane torch that had a 2" flame held against the foam. The flame did not spread and went out when the torch was removed. There was about a 4% weight loss.

Example 26

Example 18 is modified wherein another amino phosphorus containing compounds is selected from the list below and utilized in place of melamine phosphate:

| | |
|---|---|
| a) dimelamine phosphate | l) O-methyl urea |
| b) dicyandiamide phosphate | m) urea salt of boron-phosphate |
| c) urea dihydrogen phosphate | n) urea-formaldehyde phosphate |
| d) guanidine phosphate | o) aminophenol phosphate |
| e) aminoguanidine phosphate | p) ammonium urea phosphate |
| f) diethyltriamine urea phosphate | q) ammonium melamine phosphate |
| g) melamine salt of dimethyl methyl phosphonate | r) melamine salt of trimethyl phosphite |
| h) melamine salt of dimethyl hydrogen phosphite | s) melamine salt of phenyl acid phosphate |
| i) methylamine melamine phosphoric acid | |
| j) methyl carbamate salt of phosphoric acid | |
| k) melamine salt of boron-hydrogen phosphate | |

Example 27

Example 5 is modified wherein the urea condensation compound is heated and reacted with 20 percent by weight of urea, percentage based on the weight of the urea condensation compound.

Example 28

Example 8 is modified wherein the urea is first heated and reacted with itself to form a urea condensation compound then additional 20 percent by weight of urea, percentage based on the weight of the urea condensation compound, is added with the nitrogen containing compound.

Example 29

About 55 parts by weight of the partially hydrolyzed urea condensation compound produced in Example 1, 100 parts by weight of triol component (Daloflex XES 11870 by ICI of Europe) and 60 parts by weight of diphenymethane-4,4'-diisocyanate (Suprasec 2424 by ICI) were mixed and foamed into a flexible foam of about 1.5 lbs./cu. ft. After the foam cured for 1 week it was flame tested using Calif. TB 133. The foam sample passed this test with a 44 gms weight loss. Europe's UL94 HF-1, HF-2 flame test were done using a 2 cm flame from a propane torch for 1 minute placed under the ½"×2"×6" sample. This foam passed the test. The sample did not catch on fire and the melted drips did not catch on fire.

Example 30

Example 29 is modified wherein another partially hydrolyzed amino condensated compound is use in place of the one produced in example 1 and selected from the list below:
1. 55 parts by weight of partially hydrolyzed urea condensation compound of Example 2.
2. 47 parts by weight of partially hydrolyzed urea condensation compound of Example 4.
3. 45 parts by weight of partially hydrolyzed urea condensation compound of example 5.
4. 50 parts by weight of partially hydrolyzed urea-melamine condensation compound of Example 6.

The above examples were flame tested using Calif. TB 133 and UL 94 HF-1, HF-2 and all passed the tests.

Example 31

Example 29 was modified wherein a comparison test was done using 45 parts by weight of powdered melamine in place of the partially hydrolyzed urea condensation compound. A sample of this foam failed the Calif. TB 133 test.

Example 32

15 parts by weight of the partially hydrolyzed urea condensation compound of Example 4, 15 parts by weight of a polyol component (Pro-Design B by 3M) and 30 parts by weight of a MDI prepolymer (Pro-Design A by 3M) are mixed and poured into a mold thereby forming a solid flame retarded polyurethane sample ⅛"×2"×6". This sample was flame tested for 1 minute using a 2" propane flame. The flame was place under a vertical strip of this sample. The flame did not spread and there was about a 2% weight loss.

Example 33

Example 32 was modified where in 20 parts by weight of sucrose amine polyol with a hydroxyl No. of 357 was used in place of the polyol component and 22 parts by weight of polymeric MDI (Mondur by Miles) was used in place of the MDI prepolymer.

Example 34

200 parts by weight of sucrose amine polyol, hydroxyl No. 350, 30 parts by weight of dimethyl methyl phosphonate, 6 parts by weight of water, 0.1 part by weight of amine catalyst (Dabco R8020 by Air Products), 0.05 parts by weight of tin catalyst (Dabco T-12 by Air Products) 150 parts by weight of the partially hydrolyzed urea condensation compound of Example 1 and 220 parts by weight of Diphenymethane-4,4'-diisocyanate are mixed then poured into a mold. A rigid foam of about 2 lbs./cu.ft. is formed. After 1 week this foam is flame tested with a 2" propane flame by placing the flame at the bottom of a ½"×2"×6" sample for 1 minute. The flame did not spread and the flame went out when the flame was removed. A char was formed and there was about a 4% weight loss.

Example 35

Example 34 is modified wherein another polyol is used in place of the sucrose amine polyol and selected from the list below:
1. sucrose amine polyol, hydroxyl No. 530 with 25% polypropylene polyol, hydroxyl No. 450;
2. aromatic amino polyol, hydroxyl No. 530 with 25% polypropylene polyol, hydroxyl No. 650;
3. aromatic polyester polyol, hydroxyl No. 350;
4. sucrose polyol, hydroxyl No. 450;
5. phosphorus polyol (VIRCOL 82 by Albright and Wilson).
These samples were tested as above with same results.

Example 36

Example 34 is modified wherein another polyisocyanate is used in place of the MDI and selected from the list below:
1. polymeric MDI (Mondur MR by Miles)
2. polymeric MDI ( PAPI 27 by Dow)
3. polymeric MDI (Mondur MRS).

Example 37

100 parts by weight of ethylene modified polypropylene glycol (Multranol 7056 by Miles), 30 parts by weight partially hydrolyzed urea condensation compound of Example 1, 3 parts by weight of water, 1 part by weight of silicone surfactant (L6202 by Union Carbide) and 50 parts by weight of TDI (Mondur TD80) are mixed then poured into a mold. A flame retardant flexible foam of about 1.5 lbs./cu.ft. The foam was cured for 1 week then flame tested with a 2" propane flame placed under a ½"×2"×6" sample (UL94-1,HF-2 TEST). The flame did not spread and the melted drippings did not burn.

Example 38

Example 37 is modified wherein another partially hydrolyzed amino condensation compound is used in place the one produced in Example 1 and selected from the list below:
1. partially hydrolyzed urea condensation compound of Example 2;
2. partially hydrolyzed urea condensation compound of Example 3;
3. partially hydrolyzed urea condensation compound of Example 4;
4. partially hydrolyzed urea condensation compound of Example 5;
5. partially hydrolyzed urea-melamine condensation compound of Example 6;
6. partially hydrolyzed urea-dicyandiamide condensation compound of Example 8a;
7. partially hydrolyzed urea-diethylamine condensation compound of Example 8f;
The above examples were flame tested as in Example 37.

Example 38

Example 37 is modified wherein a carbonization agent is added to the polyol in the amount of 15 parts by weight and selected from the list below:

| | |
|---|---|
| 1. diaminophosphate | 10. aluminum phosphate |
| 2. dimethyl methyl phosphonate | 11. tris2-chloroethyl phosphite |
| 3. urea phosphate | 12. zinc borate |
| 4. melamine borate | 13. boron oxide |
| 5. ammonium melamine boron phosphate | 14. boric acid |
| 6. diethyl phosphite | 15. dimethyl phosphite |
| 7. ammonium polyphosphate | 16. triethyl phosphate |
| 8. dicyandimide phosphate | 17. guanidine phosphate |
| 9. ammonium phosphate | 18. ammonium sulfamate |

These examples were tested as in Example 37 and passed this test.

Example 39

30 parts by weight of partially hydrolyzed urea condensation compound produced in Example 1 and 100 parts by weight an aqueous emulsion containing 50% vinyl acetate were mixed then poured into a mold to form a ⅛" thick sample. After the sample was thoroughly dried the sample was flamed tested by using a 2" propane flame held against it for 1 minute. The flame did not spread and went out when the flame was removed.

Example 40

Example 39 is modified wherein the partially hydrolyzed urea condensation compound is replaced with a partially hydrolyzed amino condensation compound selected from the list below:
1. partially hydrolyzed urea condensation compound produced in Example 2;
2. partially hydrolyzed urea condensation compound produced in Example 3;
3. partially hydrolyzed urea condensation compound produced in Example 4;
4. partially hydrolyzed urea condensation compound produced in Example 5;
5. partially hydrolyzed urea-melamine condensation compound produced in Example 7.
7. partially hydrolyzed urea-dicyamdiamide condensation compound produced in Example 8a;
8. partially hydrolyzed urea-ammonium sulfamate condensation compound produced in Example 8j;
9. partially hydrolyzed urea-guanidine condensation compound produced in Example 8b.
These samples were tested as in Example 39 with same good results

Example 41

Example 39 is modified wherein the vinyl acetate emulsion is replaced with another emulsion containing 50% by weight of a plastic or natural products listed below;
1. vinyl acetate-ethylene copolymer (Airflex RP-226 by Air Products)
2. vinyl acetate-ethylene copolymer (Airflex RP-245 by Air Products)
3. phenol-formaldehyde resin
4. acrylic enamel paint
5. acrylic latex paint
6. methyl methyl acrylate
7. acrylic acid
8. polyurethane 9. polyester resin
10. epoxy resin
11. starch
12. modified starch
13. polyvinyl chloride
14. polyvinyl chloride-vinyl acetate copolymer
15. polystyrene
18. polyamide from vegetable protein
18. nylon
19. rubber latex
20. polybutadiene-styrene copolymer These samples were tested as in Example 39 and gave the same good results.

Example 42

Example 39 is modified where in the aqueous emulsion is replaced with an organic solvent containing a solution or emulsion of the plastic or natural product listed in Example 41 then flame tested. These samples were tested as in Example 39 and gave the same results as the aqueous emulsion in Example 39, 40 and 41.

Example 43

200 parts by weight of polyethylene is melted then 80 parts by weight of the partially hydrolyzed urea condensation compound produced in Example 1 is added and mixed with the melted polyethylene. The partially hydrolyzed urea condensation compound melts and is thoroughly mixed with the melted polyethylene, then the mixture is poured into a mold to form a ⅛" thick sample when cooled. The cooled sample is flame tested using a 2" propane flame held at the bottom of the sample for 1 minute. The flame retardant polyethylene melts but the flame does not spread and went out when the flame was removed. The melted polyethylene does not burn as it drips.

Example 44

Example 43 is modified wherein another partially hydrolyzed amino condensation compound is utilized in place of the partially hydrolyzed urea condensation compound produced in Example 1 and is selected from the list below:
1. partially hydrolyzed urea condensation compound produced in Example 2;
2. partially hydrolyzed urea condensation compound produced in Example 3;
3. partially hydrolyzed urea condensation compound produced in Example 4;
4. partially hydrolyzed urea condensation compound produced in Example 5;
5. partially hydrolyzed urea-melamine condensation compound produced in Example 6;
6. partially hydrolyzed urea-dicyandiamide condensation compound produced in Example 8a.
7. partially hydrolyzed urea-diethanolamine condensation compound produced in Example 8i.
8. partially hydrolyzed urea-melamine cyanurate condensation compound produced in Example 8t;
9. partially hydrolyzed urea-melamine phosphate condensation compound produced in Example 8o.
10. partially hydrolyzed urea-urea phosphate condensation compound produced in Example 8p;
11. partially hydrolyzed urea-guanidine carbonate condensation compound produced in Example 8r;

These samples were tested as in Example 43 with the same good results.

Example 45

Example 43 is modified wherein another plastic is utilized in place of polyethylene and selected from the list below:

1. ethylene vinyl acetate copolymer
2. polyester polyol (solid)
3. polyamide
4. vinyl acetate-ethylene copolymer (Airflex RP 226 by Air Products)
5. vinyl acetate-ethylene copolymer (Airflex RP 245 by Air products)
6. polystyrene
7. polyester hot glue
8. polyurethane flexible foam melted These samples were tested as in Example 43 and produced the same good results.

Example 46

30 parts by weight of partially hydrolyzed urea condensation compound produced in Example 1, are added to an aqueous emulsion of 100 parts by weight of styrene monomer, then a catalytic amount of potassium persulfate and ferric sulfate is added. The mixture is agitated for several hours until the styrene polymerizes. The aqueous emulsion of flame retardant polystyrene is poured into mold and allowed to dry. The dried plastic is then flame tested utilizing a 2" propane flame which is placed under and touch the plastic for 1 minute. The flame did not spread and did not burn when the flame was removed.

Example 47

Example 46 is modified wherein another plastic monomer is utilized in place of styrene monomer and selected from the list below:
1. acrylic acid monomer
2. methyl acrylic acid monomer with redox system
3. vinyl acetate monomer
4. vinyl chloride monomer with redox system
5. vinylidene chloride monomer with redox system
6. methyl acrylate monomer with redox system
7. acrylonitrile monomer with redox system
8. isoprene monomer
9. chloroprene monomer
10. butadiene with acrylonitrile
11. butadiene with styrene
12. N-vinyl pyrrolidone monomer with hydrogen peroxide
13. polyvinyl pyridine monomer
14. vinylidene chloride with vinyl chloride These samples were tested as in Example 46 with the same good results.

Example 48

Example 47 is modified wherein another partially hydrolyzed amino condensation compound is utilized in place of the partially hydrolyzed urea condensation compound of Example 1 and selected from the list below:
1. partially hydrolyzed urea condensation compound produced in Example 2;
2. partially hydrolyzed urea condensation compound produced in Example 3;
3. partially hydrolyzed urea condensation compound produced in Example 4;
4. partially hydrolyzed urea condensation compound produced in Example 5;
5. partially hydrolyzed urea-melamine condensation compound produced in Example 6;
6. partially hydrolyzed urea-dicyandimide condensation compound produced in Example 8a.

These samples were tested as in Example 46 and produced the same good results.

CONCLUSION

It is surprising that the partial hydrolysis of the amino condensation compounds greatly increase their flame retardant properties and are comparable or better flame retardant compounds than melamine and are much better in flame retarding than urea, biuret, and other amino compounds. The addition of the carbonization agents increases the development of an insulating carbon char which helps the materials to resist further degradation and thereby further exposure to flame. A plastic foam for example, which contains this partially hydrolyzed amino condensation composition resist melting when exposed to heat. The melted drippings of the material being flame tested is reduced, and any burning is minimized. There is a miminal amount of smoke given off these flame retardant material when flame tested.

These flame retardant partially hydrolyzed amino condensation compounds, the partially hydrolyzed amino-aldehyde compounds and their salts have many uses such as being added to adhesives in the production of pressed wood, plywood chipboard, etc, in flame retardant paints and varnishes, for flame retarding plastics and polyurethane foams and reacts with aldehydes to produce resins.

It will be appreciated by those skilled in the Arts that changes and modifications of the preferred embodiment can be made without departing from the spirit and broader aspects of the invention as set forth in the appended claims.

I claim:

1. A flame retardant composition produced by incorporating a partially hydrolyzed amino condensation composition and/or partially hydrolyzed amino condensation salt of phosphorus and/or boron containing compounds and/or partially hydrolyzed amino condensation-aldehyde resin condensation in an organic material, under reaction conditions and in an amount sufficient to reduce the combustibility of the organic material, said partially hydrolyzed amino condensation composition is produced by the process comprising of mixing, heating, and reacting the following components:
(A) urea
(B) nitrogen containing compound that will condensate and/or react with urea;
(C) water;
(D) aldehyde;
(E) carbonization auxiliaries;
(F) filler;
components A and B are first reacted to produce an amino condensation compound, then component C is added, mixed and reacted, thereby producing a partially hydrolyzed amino condensation compound then component D is added and reacted thereby producing a partially hydrolyzed amino condensation-aldehyde resin and then component E and F are added.

2. A flame retardant composition of claim 1 wherein the nitrogen containing compound that will condensate and/or react with isocyanic acid and/or cyanic acid, produced by heating urea, is selected from the group consisting of amino compounds, amines, polyamines, urea derivatives, thiourea, thiourea derivatives, guanidine carbonate, urea carbonates, ammonium carbamic acid, ammonium bicarbonate, polyamides, amino borates, alkylanolamines, nitrites, amides, amino phosphates and mixtures thereof; in an amount of 10 to 300 percent by weight, percentage based on the weight of urea.

3. The flame retardant composition of claim 1 wherein the carbonization auxiliaries are selected from the group consisting of phosphorus containing compounds, boron containing compounds, boron-phosphate containing compounds and sulfur containing compounds that produce acidic components in the pyrolysis mixture.

4. The flame retardant composition of claim 1 wherein the filler is selected from the group consisting of urea, melamine, dicyandiamide, melamine cyanurate, amino phosphates, aminopolyphosphates, aminoplasts, phenoplasts, powdered synthetic resins, sawdust, carbohydrates, bituminous additives, graphite, graphite compounds, cyanuric derivatives or their formaldehyde resins, powdered coke, silica, alkali metal silicates, alkaline earth metal silicates, metals, metal silicates, oxides, carbonates, sulphates, phosphates and borates, glass beads, hollow glass beads, hydrated aluminum oxide and mixtures thereof.

5. The flame retardant composition of claim 1 wherein the aldehyde is an aqueous formaldehyde.

6. The flame retardant composition of claim 1 wherein the partiallly hydrolyzed amino condensation compound is a partially hydrolyzed urea-ammonium carbamate condensation compound.

7. The flame retardant composition of claim 1 wherein the partially hydrolyzed amino condensation compound is a partially hydrolyzed urea-melamine condensation compound.

8. The flame retardant composition of claim 1 wherein the partially hydrolyzed amino condensation compound is a partially hydrolyzed urea-dicyandiamide condensation compound.

9. The flame retardant composition of claim 1 wherein the carbonization auxiliaries is a phosphorus containing compound.

10. The flame retardant composition of claim 9 wherein the phosphorus containing compound is an acidic phosphorus compound.

11. The flame retardant composition of claim 9 wherein the phosphorus containing compound is an organic phosphorus containing compound.

12. The flame retardant composition of claim 1 wherein the partially hydrolyzed amino condensation composition is utilized in an amount of 10 to 200 percent by weight, percentage based on the weight of the organic material.

13. The flame retardant composition of claim 1 wherein the partially hydrolyzed amino condensation composition is urea-guanidine condensation compound.

14. The flame retardant composition of claim 11 wherein the organic phosphorus compound is dimethyl methyl phosphonate.

15. The flame retardant composition of claim 10 wherein the acidic phosphorus compound is phosphoric acid.

16. The flame retardant composition of claim 1 wherein the organic material is a polyurethane material.

17. The flame retardant composition of claim 1 wherein the organic material is an unsaturated polyester resin and a polyester catalyst.

18. The flame retardant composition of claim 1 wherein the organic material is a polyepoxy resin and a polyepoxy catalyst.

19. The flame retardant composition of claim 1 wherein the organic material is a thermoplastic resin.

20. A method of reducing the combustibility of an organic material comprising incorporating a partially hydrolyzed amino condensation composition with the organic material, under reaction conditions of the organic material, said partially amino condensation composition produced by the method comprising of mixing, heating and reacting the following components:

(A) urea; in the amount of 100 parts by weight;
(B) nitrogen containing compound that will condensate and/or react with isocyanic and/or cyanic acid produced by heating a urea compound; in the amount of 10 to 300 percent by weight, percentage based on the weight of urea;
(C) water; in the amount of 10 to 40 parts by weight;
(D) aldehyde;
(E) carbonization auxiliaries;
(F) filler;
component A with itself or component A and B are first reacted to produce an amino condensation compound, then component C is added, mixed, heated and reacted thereby producing a partially hydrolyzed amino condensation compound, then component D is added and reacted thereby producing a partially hydrolyzed amino condensation-aldehyde resin, then component E is added then mixed and/or reacted, then component F is added.

21. The method of claim 20 wherein the partially hydrolyzed amino condensation composition is a partially hydrolyzed urea condensation compound having the general formula of:

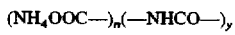
$(NH_4OOC\!-\!)_n(\!-\!NHCO\!-\!)_y$ wherein n is a number 1–3 and y is a number 1–8.

22. The method of claim 20 wherein the partially hydrolyzed amino condensation composition is a partially hydrolyzed urea-amino condensation compound having the general formula of:

$(NH_4OOC\!-\!)_n(\!-\!NHCO\!-\!)_y(NHCH\!-\!)_z$ wherein n is a number 1–3, y is a number 1–8 and z is a number 0–8.

23. The method of claim 20 wherein the amino condensation composition is a partially hydrolyzed urea-melamine condensation compound.

24. A flame retardant composition produced by incorporating a partially hydrolyzed amino condensation compound in an organic material, under reaction conditions and in an amount sufficient to reduce the combustibility of the organic material, said amino condensation compound is produced by reacting 100 parts by weight of urea with 10–40 parts by weight of water under reaction conditions.

25. A flame retardant partially hydrolyzed amino compound produced by the process comprising of mixing, heating and reacting the following components:
(A) urea; in the amount of 100 parts by weight;
(B) nitrogen containing compound that will condensate and/or react with heated urea; in an amount of 10 to 300 percent by weight, percentage based on the weight of urea;
(C) water; in an amount of 10 to 40 parts by weight;
component A and B are first reacted thereby producing an amino condensation compound which is then reacted with component C.

26. The flame retardant partially hydrolyzed amino compound of claim 25 wherein component B is urea.

27. The flame retardant partially hydrolyzed amino compound of claim 25 wherein component B is melamine.

28. A flame retardant partially hydrolyzed amino condensation-aldehyde resin produced by the process comprising of mixing, heating and reacting the following components:
(A) urea; in the amount of 100 parts by weight;
(B) nitrogen containing compound that will condensate and/or react with heated urea; in an amount of 10 to 300 percent by weight, percentage based on the weight of urea;
(C) water; in an amount of 10 to 40 parts by weight;
(D) aldehyde;
(E) basic or acidic catalyst;
components A and B are first reacted thereby producing an amino condensation compound then component C is added and reacted thereby producing a partially hydrolyzed amino condensation compound, then component D and component E are added and reacted.

29. A flame retardant partially hydrolyzed amino condensation salt of a phosphorus containing compound produced by the process comprising of mixing, heating and reacting the following components:
(A) urea; in the amount of 100 parts by weight;
(B) nitrogen containing compound that will condensate and/or react with heated urea; in the amount of 10 to 300 percent by weight, percentage based on the weight of urea.
(C) water; in an amount of 10 to 40 parts by weight;
(D) phosphorus containing compound that will react with partially hydrolyzed amino condensation compound;
components A and B are reacted thereby producing an amino condensation compound then component C is added and reacted thereby producing a partially hydrolyses amino condensation compound, then component D is added and reacted.

30. A flame retardant partially hydrolyzed amino condensation salt of a boron oxyacid compound produced by the process comprising of mixing, heating and reacting the following components:
(A) urea; in the amount of 100 parts by weight;
(B) nitrogen containing compound that will condensate and/or react with heated urea; in the amount of 10 to 300 percent by weight, percentage based on the weight of urea;
(C) water; in an amount of 10 to 40 parts by weight;
(D) boron oxyacid;
components A and B are reacted thereby producing an amino condensation compound, then component C is added and reacted thereby producing a partially hydrolyzed amino condensation compound, then component D is added and reacted.

* * * * *